United States Patent
Tal et al.

(10) Patent No.: US 6,662,254 B1
(45) Date of Patent: Dec. 9, 2003

(54) SYSTEM ARCHITECTURE

(75) Inventors: Doron Tal, Kefar Shemariaho (IL); Gonen Zilber, Petach Tikva (IL); Gil Biran, Raananna (IL)

(73) Assignee: Axerra Networks, Ltd., Tel Aviv (IL)

( * ) Notice: Subject to any disclaimer, the term of this patent is extended or adjusted under 35 U.S.C. 154(b) by 582 days.

(21) Appl. No.: 09/599,797

(22) Filed: Jun. 22, 2000

(51) Int. Cl.[7] .......................... G06F 13/00; G06F 3/00; G06F 13/38
(52) U.S. Cl. .............................. 710/300; 710/2; 710/71
(58) Field of Search ................................ 710/2, 62, 71, 710/300–302, 305, 306, 311, 312, 313, 314, 315

(56) References Cited

U.S. PATENT DOCUMENTS

| | | | |
|---|---|---|---|
| 4,937,777 A | | 6/1990 | Flood |
| 5,038,317 A | | 8/1991 | Callan |
| 5,530,842 A | | 6/1996 | Abraham |
| 5,544,162 A | | 8/1996 | Mraz |
| 5,764,924 A | * | 6/1998 | Hong .......................... 710/300 |
| 5,781,747 A | * | 7/1998 | Smith et al. ................. 710/300 |
| 5,802,278 A | | 9/1998 | Isfeld |
| 5,905,781 A | | 5/1999 | McHale |
| 6,003,105 A | * | 12/1999 | Vicard et al. ................ 710/314 |
| 6,088,752 A | * | 7/2000 | Ahern .......................... 710/303 |
| 6,282,599 B1 | * | 8/2001 | Gallick et al. ............... 710/306 |
| 6,425,033 B1 | * | 7/2002 | Conway et al. .............. 710/305 |
| 6,484,213 B1 | * | 11/2002 | Nouri ............................ 709/249 |
| 6,526,465 B1 | * | 2/2003 | Voth et al. ................... 710/301 |
| 2001/0040466 A1 | * | 11/2001 | Ide ................................ 326/83 |

FOREIGN PATENT DOCUMENTS

WO 99/59075 11/1999

* cited by examiner

Primary Examiner—Glenn A. Auve
Assistant Examiner—Trisha Vu
(74) Attorney, Agent, or Firm—Katten Muchin Zavis Rosenman (57) ABSTRACT

A system for a high capacity computer-based communications device is described. The system has an enhance backplane supporting a plurality of busses working independently of each other and each utilized for a different data type. The backplane supports a cPCI bus, a H.110 bus, and a StarLan bus. The system provides for increasing the capacity of the cPCI bus through bridging between two cPCI segments. A first serializer, operatively connected to the first cPCI segment, is used to receive data from a first PCI bus, serializes the data, and transfers the serial data stream to a second serializer which is operatively coupled to the second bus. The second serializer de-serializes the transferred data and transfers it to the second PCI bus. The backplane is utilized with a router and I/O modules to provide a device which combines traditional IP routing capabilities with a gateway for non-IP traffic to the IP network. A unique routing method is utilized to reduce the overhead associated with identifying data flows at the I/O module. The router receives the incoming datagrams and looks at the layer 3 and above headers to determine which I/O module to send the data to and to identify the data flow. The router then encapsulates the data into a specialized frame which designates the I/O module and uniquely identifies the data flow and forwards this over the network bus to the appropriate module. The module then determines the destination of the data via the specialized frame without having to look at the layer 3 and above headers.

28 Claims, 11 Drawing Sheets

SYSTEM ARCHITECTURE

FIELD OF THE INVENTION

The present invention relates generally to the field of communication devices. More specifically, the present invention is related to high capacity computer-based telecommunication devices.

BACKGROUND OF THE INVENTION

As computer telephony becomes an integral part of the existing communications network, including the Internet, there are increasing challenges in making diverse communication products work together. One of the elements in the development of computer-based communications has been the incorporation of auxiliary telecom busses to existing computer systems. These busses are incorporated into high capacity computer-based telecommunications equipment and typically transport N×64 Kbps low-latency communications traffic between the cards of the system, independently from the computer's I/O and memory busses. One such bus is defined by the Enterprise Computer Telephony Forum and is designated as H.110. H.110 is a TDM based bus providing up to 4096 time slots at 8 MHz for voice and/or data communications. This bus has been targeted to CompactPCI (cPCI) form factor products. The incorporation of this bus into the computer systems meeting the cPCI specification has been met with some problems in the art as will be discussed below.

CompactPCI is a standard laid forth by the PCI Industrial Manufacturers Group (PICMG) which specifies an electrical superset of desktop PCI utilizing a form factor suitable for rugged applications (e.g. industrial computers). The form factor of cPCI is based upon the Eurocard form factor popularized by the VME bus. CompactPCI utilizes 2 mm metric pin and socket connectors with cPCI cards inserted from the front of the chassis with I/O breakout either to the front or rear.

Figure 1:
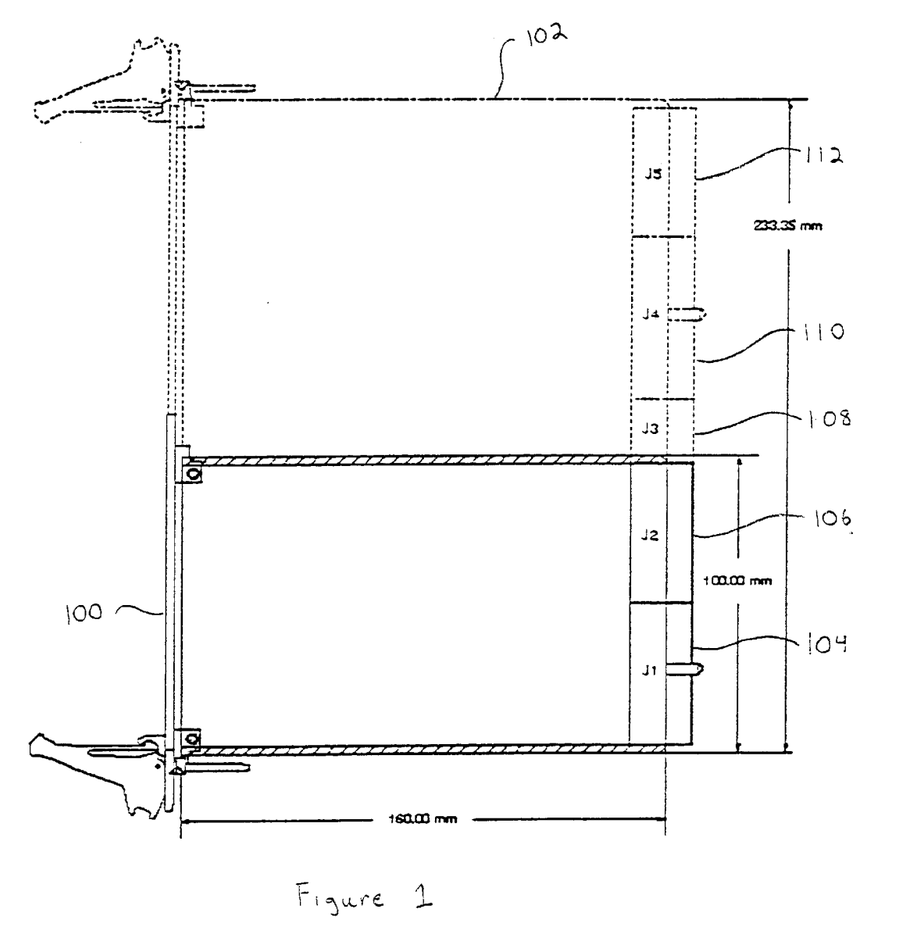
FIG. 1 illustrates the form factor for cPCI cards.

The form factor for cPCI cards is illustrated in FIG. 1. CompactPCI standard supports both 3U 100 (100 mm by 160 mm) and 6U 102 (233.35 mm by 160 mm) card sizes. The rear card connectors are designated J1–J5 (or P1–P5) 104–112, in the PICMG specification, starting from the bottom of the card. 3U 100 cPCI cards utilize both J1 104 and J2 106 providing 220 pins for power, ground and all 32 bit and 64 bit PCI signals. The J1 104 (or P1) is 110 pins and the J2 106 (or P2) is 110 pins. The card connectors are female connectors and the backplane connectors are male connectors. The 3U form factor is the minimum for cPCI supporting 64 bit transfers, however, cards which are to only perform 32 bit transfers can utilize only the lower connector J1 104. 6U 102 extensions are defined for cards where extra card area or connection space is needed. The use of the remaining connectors J3 108, J4 110, and J5 112 are designated in the specification as capable of being user designed for specific applications.

Figure 2:
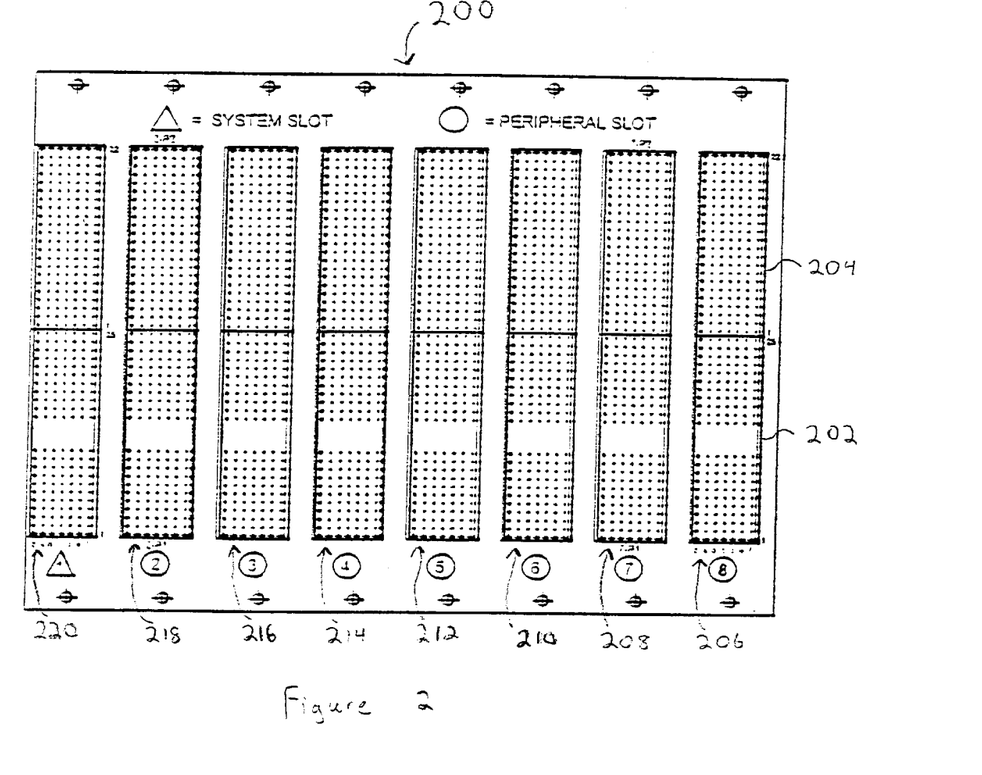
FIG. 2 illustrates a typical cPCI backplane utilizing a single cPCI segment.

A cPCI system is composed of one or more cPCI bus segments. Each segment comprises up to eight (eight being the limitation due to electrical load considerations) card locations at 33 MHz. A typical cPCI backplane utilizing a single cPCI segment 200 is illustrated in FIG. 2. The cPCI backplane comprises the male J1 202 and J2 204 (only numbered for slot 8 206 for clarity) connectors for each of the card locations/slots 206–220. Each cPCI segment comprises a system slot 220 and up to seven peripheral slots 206–218. The system slot card (system card) provides arbitration, clock distribution and reset functions for the other cards on the segment. The system slot card is also manages each local card's IDSEL signal in order to perform system initialization.

Figure 3:
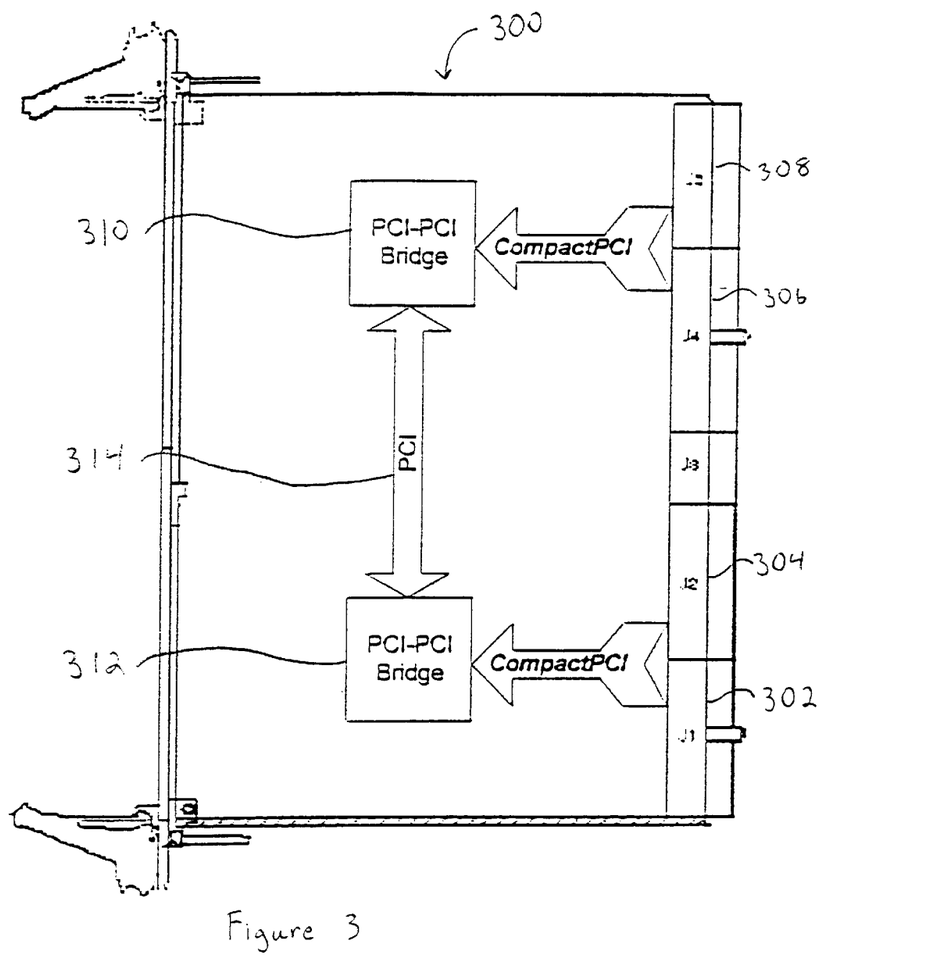
FIG. 3 illustrates the PICMG method for cPCI system cards to drive two independent PCI bus segments.

At times, a cPCI system needs to utilize more than eight slots. The PICMG defines a means for cPCI system cards to drive two independent PCI bus segments in a 6U environment. This is illustrated in FIG. 3. System card 300 is constructed to the 6U form factor with the first PCI segment/bus connected to connectors J1 302 and J2 304. The second PCI segment/bus is connected to the card via connectors J4 306 and J5 308. The first bus is referred to the PCI bus A or PCI bus B while the second bus is designated as the PCI bus C. System card 300 utilizes PCI bridge chips 310, 312 and an on card PCI bus to bridge between the first segment and the second segment.

Purportedly, one of the advantages to implementing a system utilizing a 6U form factor is to support extra features for an industrial system. For instance the industrial computer system is designed for computer telephony applications. In these instances, a provision must be made for a telecom bus for the transport and switching of telecom data streams between the cards in the chassis. Two important specifications related to the implementation of a telecom bus in a cPCI chassis are the PICMG 2.5 Computer Telephony specification and the ECTF H.110 (CT) bus specifications. The specifications make use of the J4 connector and, therefore, the J4 connector is a precious connector for telecommunication equipment manufacturers. The PICMG architecture for bridging between two PCI segments creates a wasteful use of the J4/J5 connectors and further prevents the addition of a second telecom bus such as the H.110.

There is an additional need for a high capacity computer-based telecommunications device which can support a number of communication protocols. The system architecture of the present invention allows for the creation of a high capacity computer-based device which can handle a number of communication protocols. As previously noted, the Internet, or IP based networks in general, have become an important part of the current communications infrastructure. In a further embodiment, the present invention's unique architecture is utilized to provide a device which combines traditional IP routing capabilities with a gateway for non-IP traffic to the IP network. When the high capacity computer-based telecommunications device based upon the system architecture is used as a gateway, there are difficulties associated with the routing of the data, as will be described below.

The IP routing means that the device can receive IP datagrams from one IP network and forward it to the correct destination, according to the destination IP address within the datagram. When working as a gateway, a voice gateway for example, the device uses its own IP address to represent the non-IP voice channels on the IP network. To separate the incoming IP datagrams to their specific voice channel, there's a need to identify each voice flow. Since all those flows use the device IP as destination address, there's a need to look at higher layer parameters to identify a flow. Voice streams, for example, use TCP and RTP as transport layers. Each voice flow is identified by a unique <source IP, source UDP port, destination IP, destination UDP port>combination.

The handling of IP routing involves mapping of the 32 bits of the IP address to a correct destination (traditional routing operation). Since there are $2^{32}$ different IP address, it's not practical to use a lookup table that stores the destination information, where the IP address is the entry index to this lookup table. In order to solve this mapping problem, there's a need to employ more sophisticated hashing and caching algorithms. The problem is further complicated when dealing with locally designated IP data flows (flows whose destination IP address is the local IP address of the device). These are used when the device is working as a gateway from IP to non-IP traffic.

Traditional IP routing typically involves routing only at layer 3 (by mapping the IP address as described above). A traditional router does not look at the layer 4 and above protocols to determine a destination. Datagrams are simply encapsulated in a MAC frame and forwarded to the destination device. It is the responsibility of the layer 4 and above protocols at the destination device to properly identify the unique flow (typically based upon the IP destination and source address and the TCP/UDP source and destination address). This requires additional overhead on the destination device's layer 4 and above software/hardware, as it has to decode the layer 3, 4 and above headers in order to identify the data flow.

Due to the fact that IP data is packet based, busses which follow packet based standards are advantageous to utilize in the transmission of IP datagrams. One such set is so called LANs based upon IEEE 802 standards. For these "network busses", the IEEE 802 standards specify the layer 1 and layer 2 protocols. One of the most commonly utilized standards is the IEEE 802.3 (Ethernet and Fast Ethernet), and more recently the IEEE 802.3 z (Gigabit Ethernet), all based upon a CSMA/CD medium access control technique.

These busses may be arranged in a number of topologies. One such topology is the star topology. In the star topology, each device connected to the bus is connected directly to a common central node utilizing point-to-point connections. Other commonly utilized topologies include bus, tree, and ring.

The system architecture of the present invention provides a solution to the problems, along with additional advantages, which will be obvious to one of skill in the art from the detailed description, drawings and appended claims.

SUMMARY OF THE INVENTION

The backplane of the present invention is an enhance backplane supporting a plurality of busses working independently of each other and each utilized for a different data type. The backplane supports at least one peripheral connection bus (I/O bus), at least one telecom bus, and at least one network bus. The system provides for the scalability of the peripheral connection bus through bridging between two peripheral connection busses. A first serializer, operatively connected to the first peripheral bus, is used to receive data from a first peripheral connection bus, serializes the data, and transfers the serial data stream to a second serializer which is operatively coupled to the second bus. The second serializer de-serializes the transferred data and transfers it to the second peripheral connection bus.

The backplane is utilized with a router and I/O cards to provide a device which combines traditional IP routing capabilities with a gateway for non-IP traffic to the IP network. A unique routing method is utilized to reduce the overhead associated with identifying data flows at the I/O card. The router receives the incoming datagrams and looks at the layer 3 and above headers to determine which I/O card to send the data to and to identify the data flow. The router then encapsulates the data into a specialized frame which designates the I/O card and uniquely identifies the data flow and forwards this over the network bus to the appropriate card. The card then determines the destination of the data via the specialized frame without having to look at the layer 3 and above headers.

DESCRIPTION OF THE PREFERRED EMBODIMENTS

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

Figure 4:
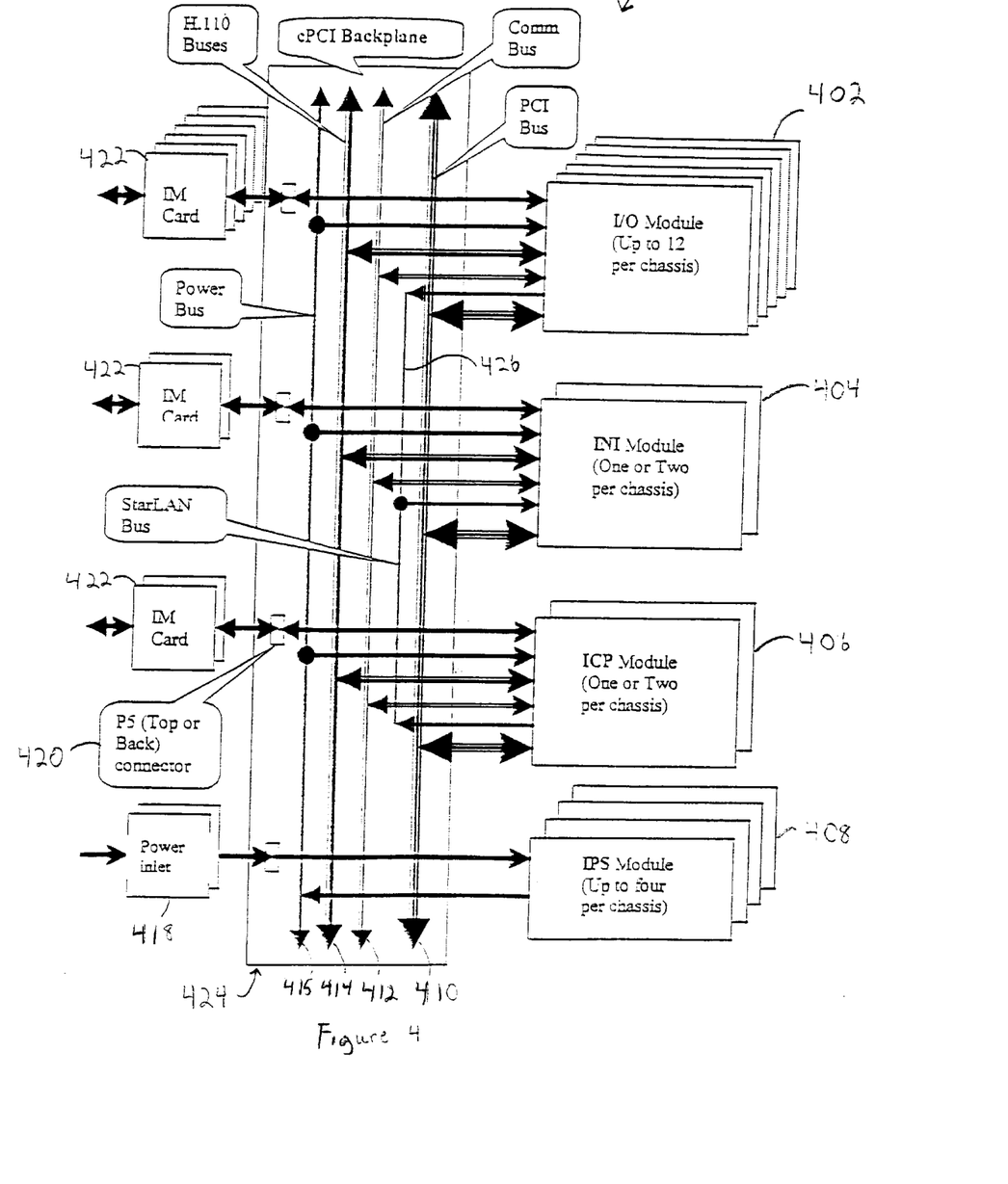
FIG. 4 illustrates the general architecture of a device according to the present invention.

FIG. 4 illustrates the general architecture of a device according to the present invention. The computer system includes a chassis, which hosts a passive backplane which interconnects different types of system and interface modules. The system and interface modules include power supply module(s) 408, central processing module(s) 406, network interface module(s) 404, and Input/Output (I/O) module(s) 402. Power supply module(s) 408 are standard cPCI 3U power supplies. Central Processing module(s) 406 is responsible for managing the system configuration, monitoring the status of the system and arbitrating the bus. At times it is preferable to provide more than one central processing module 406 in order to provide a master/standby configuration for redundancy.

Backplane 424 is an enhanced cPCI compatible backplane which includes the standard 2 mm connectors. As previously described, a cPCI compatible bus supporting 6U system cards includes 5 connectors per slot. The novel backplane of the system comprises a number of busses. The PCI bus 410 is a standard 32/64 bit cPCI bus. There are 2 cPCI segments, bridged in a unique fashion via a serial bus, working at 33

MHz and supporting 8 slots each. PCI bus 410 is implemented in the J1/J2 connectors according to the cPCI standard. This bus is the I/O bus for the system and is used for signaling and control communication between the modules of the system.

There are two H.110 busses 414 located on the backplane. The first of these is a standard H.110 bus implemented in the J4 connector, according to the standard. The second is a full H.110 bus implemented in the J3 connector in a proprietary way. These busses are utilized for transferring real time digital T1/E1 telephony between the modules of the system. These busses support 2*4096 time slots, or 128 T1/E1's. The architecture supports full non-blocking cross connect for 256 T1/E1 lines.

The communication bus 412 is a serial shared bus connecting all modules in the system. This bus is working at 10 MHz and implements an HDLC shared communication. Communication bus 412 is used for control information and as a redundant path for signaling information.

The network bus 426 is a StarLan bus (star topology) which provides a collection of high speed point to point connections between the network module(s) 404 and all other modules of the system. This bus is used with redundancy when two network modules 404 are installed. Each connection is working at 100 Mb/s (FETH) or 1000 Mb/s (GETH). StarLan bus 426 transfers IP information from the I/O module(s) and central processing module(s) to the, main link interface 404.

Power bus 416 transfers power from power supply module(s) 408, which receive power via power inlet 418, to all the modules in the system. This bus is implemented utilizing the standard cPCI pins.

Each module is connected to its respective interface (IM) card(s) 422 via the J5 connector on the backplane. The IM card(s) 422 provide the interface and physical connector which connects the respective module to the "outside" world (externally of the system). The use of the IM cards enable replacement of the system modules without the need to disconnect any cables. On the I/O slots the backplane (through J5) support 16 T1/E1 interfaces, 4 T3/E3 interfaces, 2 STM1 interfaces and up to 8 Ethernet interfaces. On the network slot(s), the backplane supports 2 STM1/4 interfaces, 2 GbEth interfaces and up to 8 Ethernet interfaces.

As previously mentioned, two cPCI segments are uniquely bridged via a serial connection (separate from the above described serial communication bus). A PCI serializer transparently transceives PCI frames across the cPCI backplane. Although spare pins are available for the serial-bridging channel to be located in the J1/J2 connectors, J3 is used to provide compatibility with current PICMG specification for the PCI connectors. This provides for a preferred embodiment feature of maintaining the availability of the J4/J5 connectors.

Figure 5:
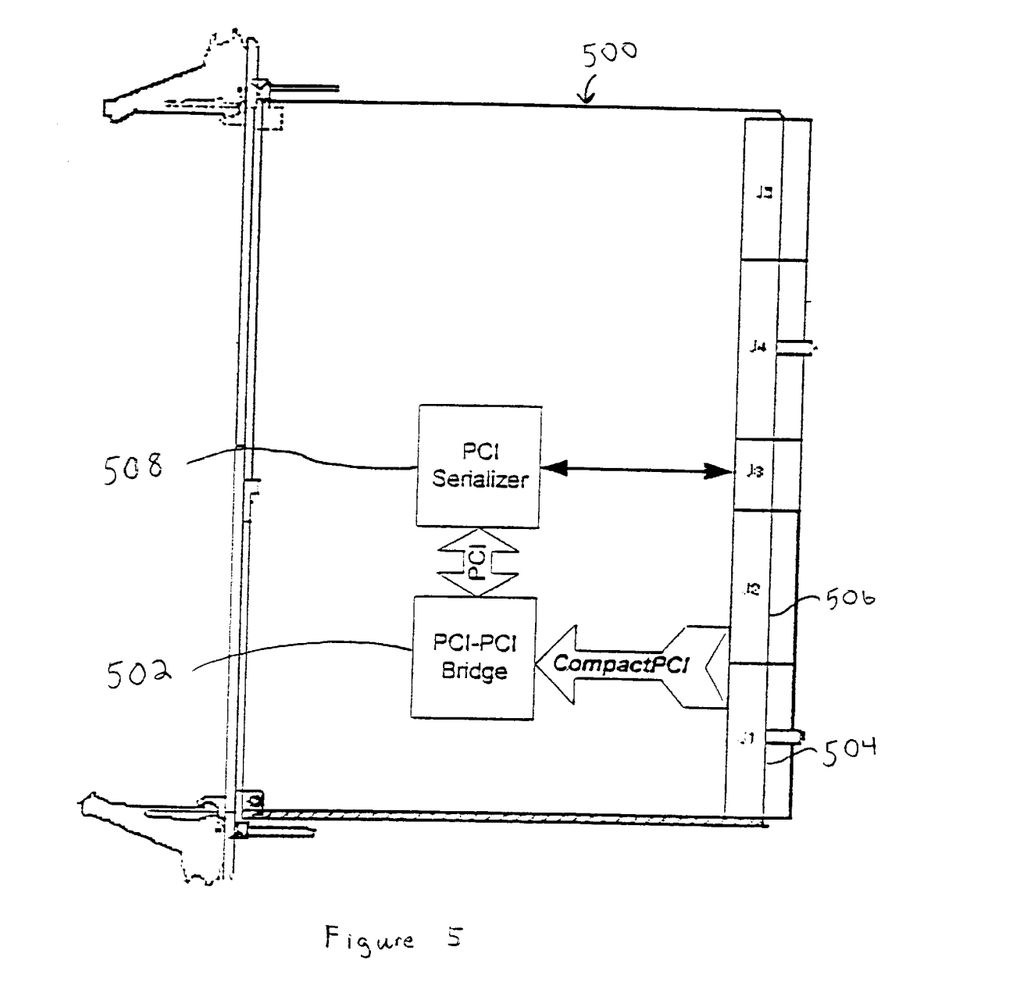
FIG. 5 illustrates a block diagram of a card equipped to perform the serial bridging between the cPCI segment.

FIG. 5 demonstrates a block diagram of a card equipped to perform the bridging between the cPCI segments. Preferably, this is implemented in the system card, however, a separate card may be utilized. System card 500 has a PCI-PCI bridge chip 502 located thereon. Bridge chip 502 is connected to the PCI bus via connectors J1 504 and J2 506. An oncard PCI bus connects the bridge chip to PCI serializer/deserializer 508 which serializes the data and sends it to the second cPCI segment where an I/O card has a deserializer and a second bridge to place the data on the second PCI bus located on the second segment. The serial bus is connected to the serializer 508 and deserializer via the J3 connector. By utilizing a proprietary H.110 bus connected to the J3 connector, free pins are used on the J3 connector to provide the serial bus. Preferably, the serial communication utilizes Low Voltage Differential Signaling (LVDS) so that only two pins per pair are required and a common ground between the two segments is not needed.

Use of this PCI Serialization technology enables the transparent transfer of PCI frames. These advances physically extend the cPCI bus after packetization on the corresponding segment.

Figure 6:
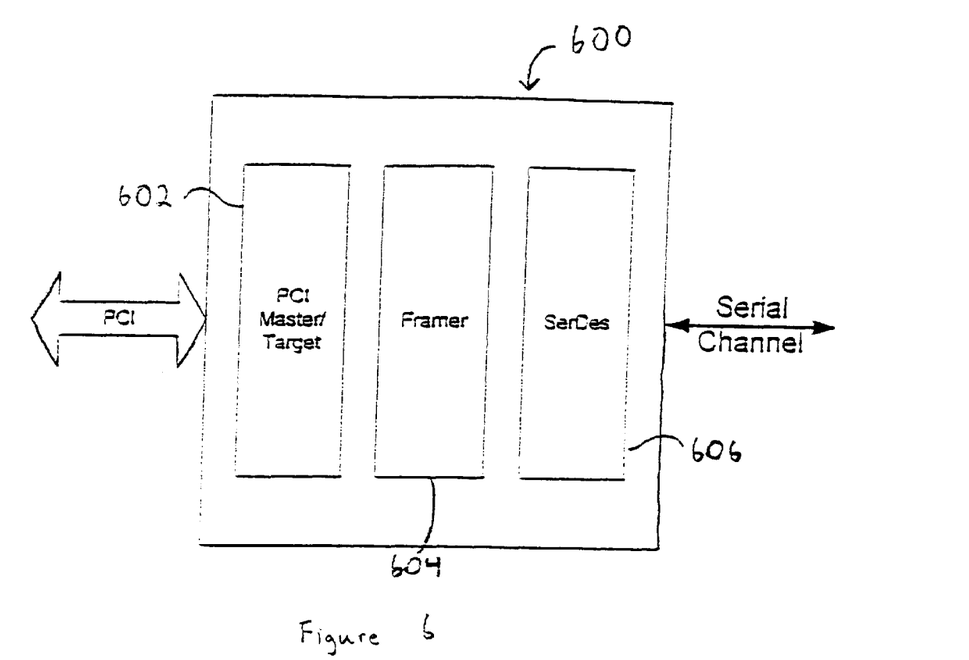
FIG. 6 illustrates a general block diagram of the PCI serializer/deserializer.

FIG. 6 illustrates a general block diagram of the PCI serializer/deserializer located on the appropriate cards of each segment. PCI Serializer 600 is comprised of three main blocks. A PCI master/target block 602 which interfaces to the PCI bus. A framer 604 orders the PCI frames. A high speed serializer/deserializer 606 serializers the data and transfers it across the serial channel.

Preferably, the serial channel provides a bandwidth that will not hinder the eight slot per segment cPCI bus. The serial channel is built out of 4 full duplex pairs, each providing 622 mbps of bandwidth. Current cPCI technology enables an eight-segment cPCI bus to operate 64 bit at 33 MHz which is a bandwidth of 2 Gbit/s. Subsequently, the PCI front end of the serializer must sustain this bandwidth and operate at either 64 bit/33 MHz or a more efficient PCI Local bus topology of 32 bit/66 MHz.

Figure 7:
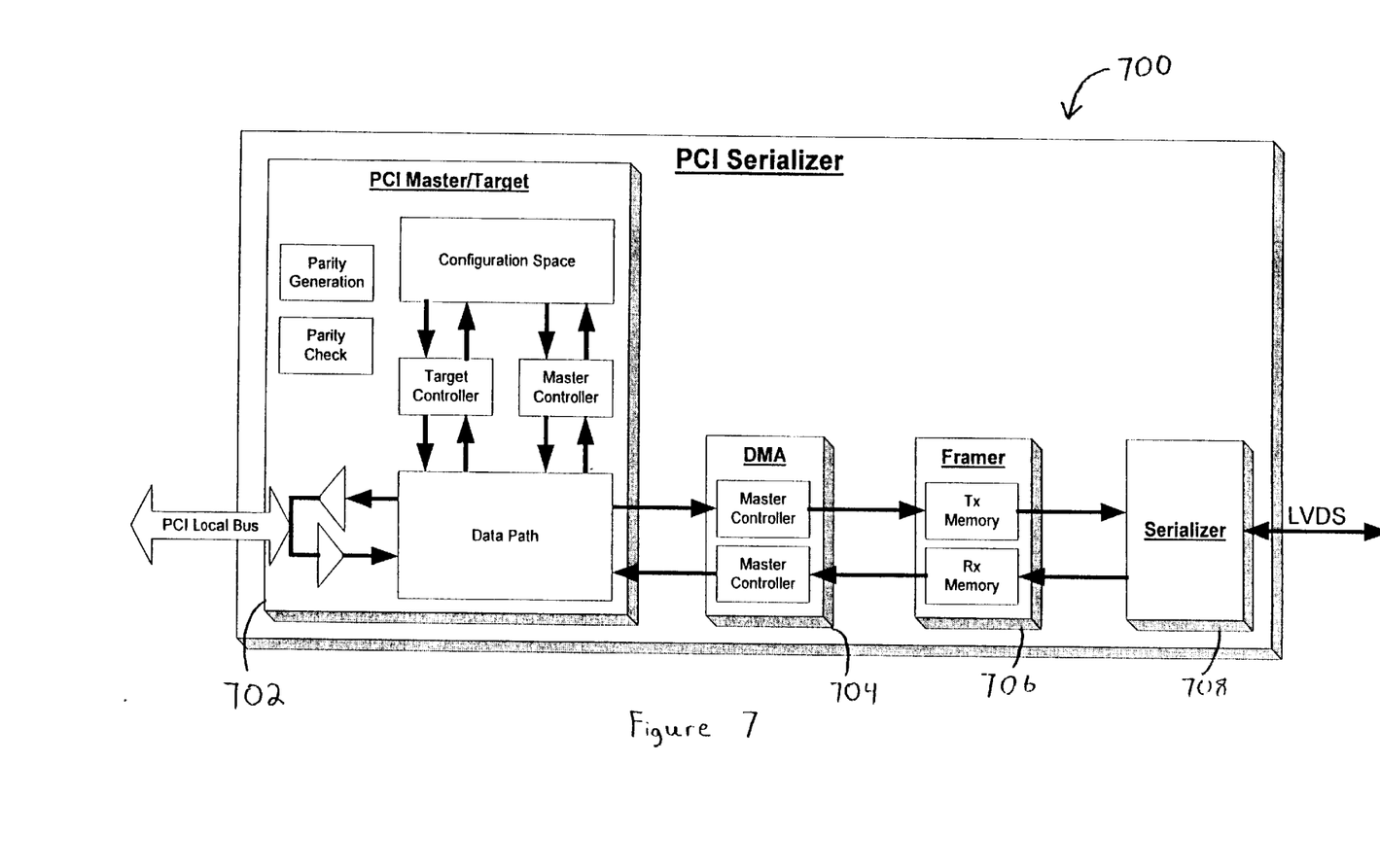
FIG. 7 illustrates a more detailed view of the PCI serializer/deserializer.

FIG. 7 provides a more detailed view of the PCI serializer/deserializer. There are separate physical receive and transmit serial channels. Inside the PCI serializer/deserializer 700, the serial stream is deserialized and passed through the framer 706. Rx DMA control logic 704 synchronizes between the framer and the PCI Master/Target core 702 which interfaces to the Local/oncard PCI bus. The PCI Local Bus-to-Compact PCI bridge handshakes with the serializer 700 to enable or disable frame flow. Serial interface 708 is based on mature LVDS technology, which is widely used for high-speed serial links.

Figure 8:
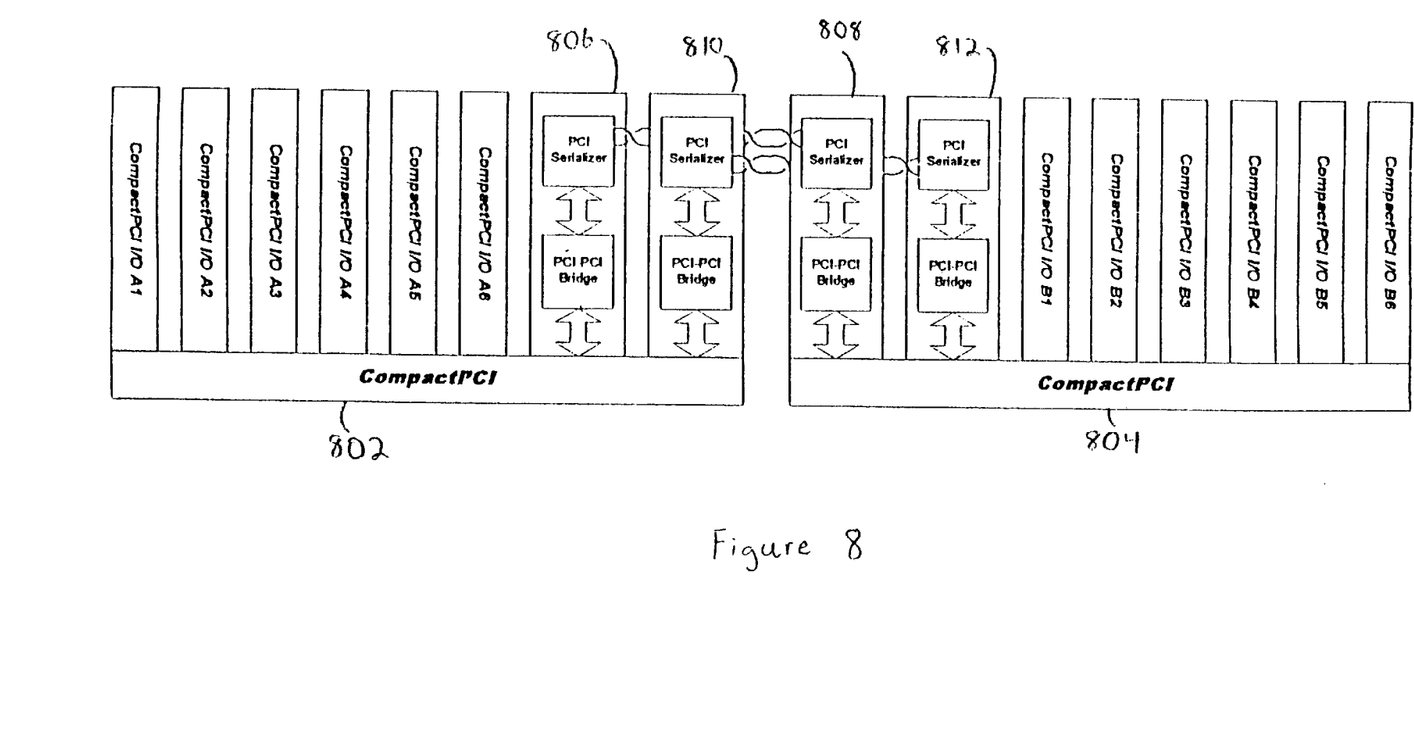
FIG. 8 illustrates cPCI segment bridging with redundancy.

Due to the low pin count of the serial bridging bus, redundancy can be implemented to provide a system host backup in the event of a failure. FIG. 8 illustrates this system architecture.

Segment bridging is provided when a system card 810 in segment A 802 is bridged to an I/O card 812 containing a PCI serializer on segment B 804. Redundancy is achieved when an additional system card 808 on segment B 804 functions in a slave mode (is not the system host) and is bridged to an I/O card 806 containing a PCI serializer on segment A 802. In the case that redundancy is not supported, the bridge between the two segments is done between the two system cards 810 and I/O card 812 on the two segments.

This redundancy architecture proposes a system host Master and Slave cards. Arbitration and clock distribution are handled on a per segment basis. For example, host Master 810 on segment A 802 provides clock distribution and PCI bus arbitration for segment A 802 with its consociate I/O 812 card linked via the serial channel providing the clock distribution and PCI arbitration services on segment B 804. After a redundant switchover, the Master 808 on segment B 804 provides the clock distribution and PCI arbitration services on segment B 804 while the I/O card 806 on segment A 802, linked via the serial channel, provides the clock distribution and PCI arbitration services for segment A.

Additional lines or a dedicated communication channel may be implemented to synchronize between the Master and Slave host cards in order to provide application redundancy.

In a further embodiment, the unique architecture is utilized to provide a device which combines traditional IP routing capabilities with a gateway for non-IP traffic to the IP network. As previously described, there are difficulties associated with the routing of the data.

Local designated data flows are flows whose destination IP address is the local IP address of the device. In order to identify a specific flow, there is a need to look at least at the source IP address (32 bits) and additional fields in the upper layers. For example, both UDP and TCP flows are defined by a source IP address, source UDP/TCP port, destination IP address and destination UDP/TCP port. To differentiate the UDP from TCP and other protocols, there's a need to look at another field that contains the protocol identifier. Therefore, when we want to identify a certain UDP flow, for example, we have to map 72 bits (32 bits of source IP+8 protocol ID+16*2 for source and destination UDP ports) to the correct destination.

The implementation of such algorithms can't be done by software, at wire speed, on high bandwidth networks. To handle one, full duplex, gigabit Ethernet link with minimal frame size, there's a need to do about 3.9*10^6 mappings per second (10^9[Mb/s]/8[b/Byte]/64[Byte/Frame]*2 [directions]=3.9*10^6. Therefore, there are special ASICS designed to handle IP switching and flow classification at wire speed, for high capacity networks.

Figure 9:
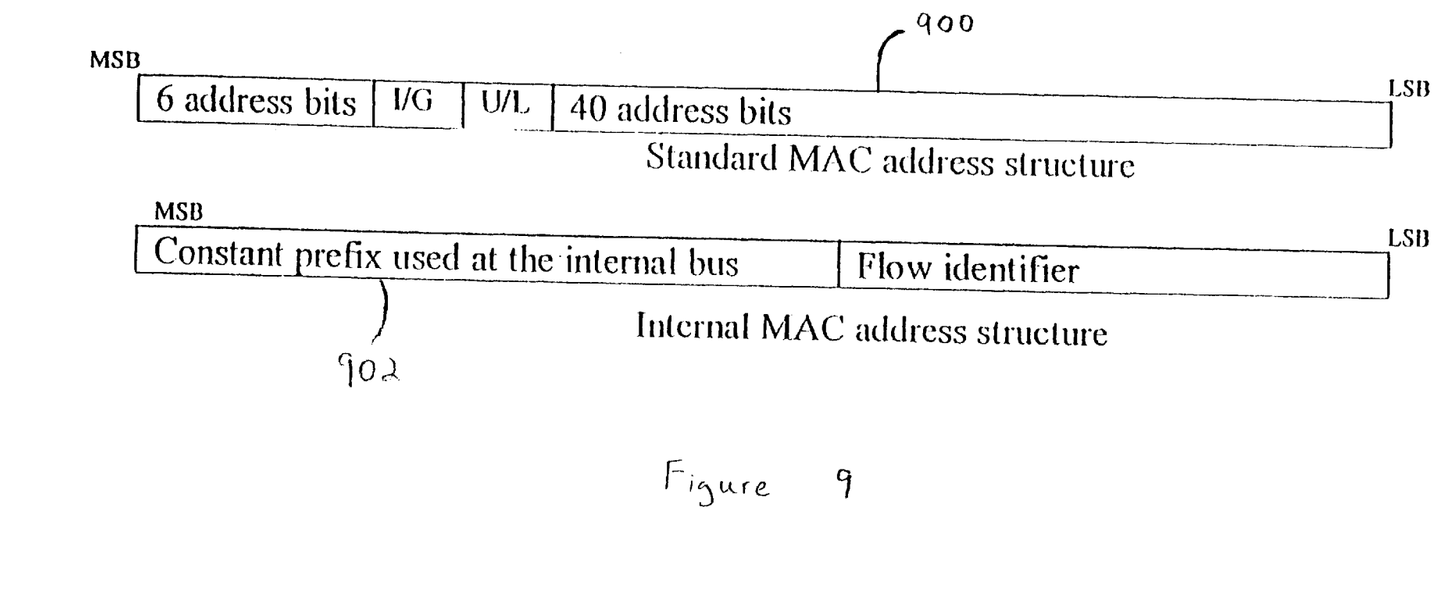
FIG. 9 illustrates a standard MAC address structure and the internal MAC address structure of the device of the present invention.

One embodiment of the present invention utilizes the unique architecture of FIG. 4 to combine traditional IP routing with a gateway for non-IP traffic to IP networks. It comprises one central IP routing and flow identifier switching module (router module) and I/O modules. The connection between each I/O module and the router module is done via internal 100/1000 Ethernet connections/network bus on the backplane. The router module is responsible to do the entire layer 3 and above handling. It uses special ASIC chips, like network processors, to do it at full wire speed. The I/O module handles only the link layer of the different protocols that are attached to it and the encapsulation—de-encapsulation of protocols. The I/O card doesn't have to look and/or switch according to the IP layer and the upper layers parameters of the traffic. Since the Ethernet bus that connects the router card with the I/O cards is an internal bus (this Ethernet segment will never be connected to any external Ethernet segment) a proprietary MAC address allocation is used. The MAC addresses on this bus are a continuous MAC address range; therefore the lowest part of the MAC address can be treated as internal flow identifier. FIG. 9 illustrates a standard MAC address structure 900 and the internal MAC address structure of the device 902. As shown, the LSBs of the internal address structure 902 are utilized as a destination identifier (flow identifier), while the MSBs remain constant for a given device. The number of bits utilized for the flow identifier is dependent upon the number of destinations located within the device, and are therefore, a parameter which is based upon the design of the device. A MAC address from this internal MAC range is assigned to any destination inside the device (where the destination is a certain entity in one of the I/O cards).

Figure 10:
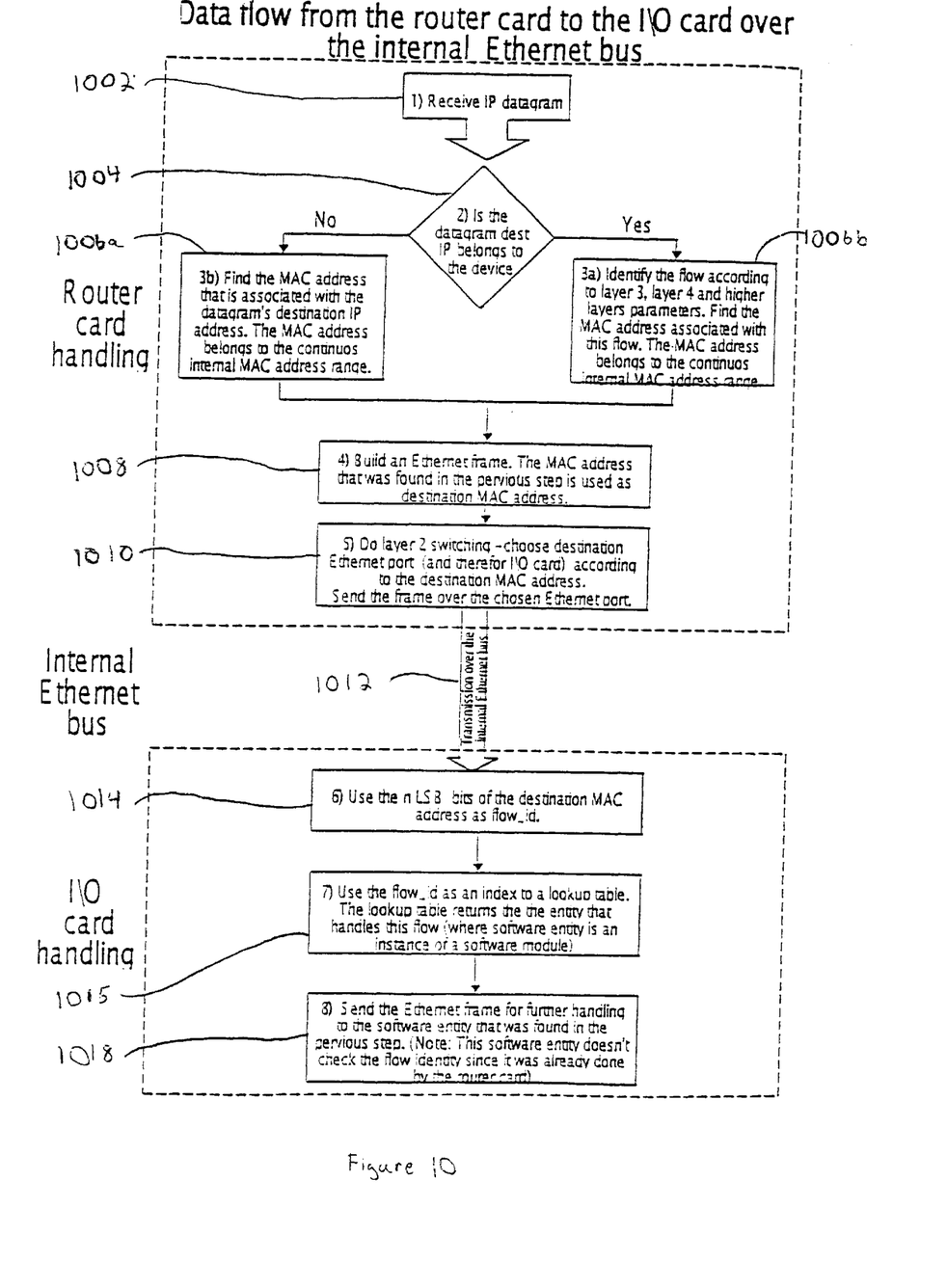
FIG. 10 illustrates the data flow between the router card to I/O card for both locally and remotely designated IP flows.
Figure 11:
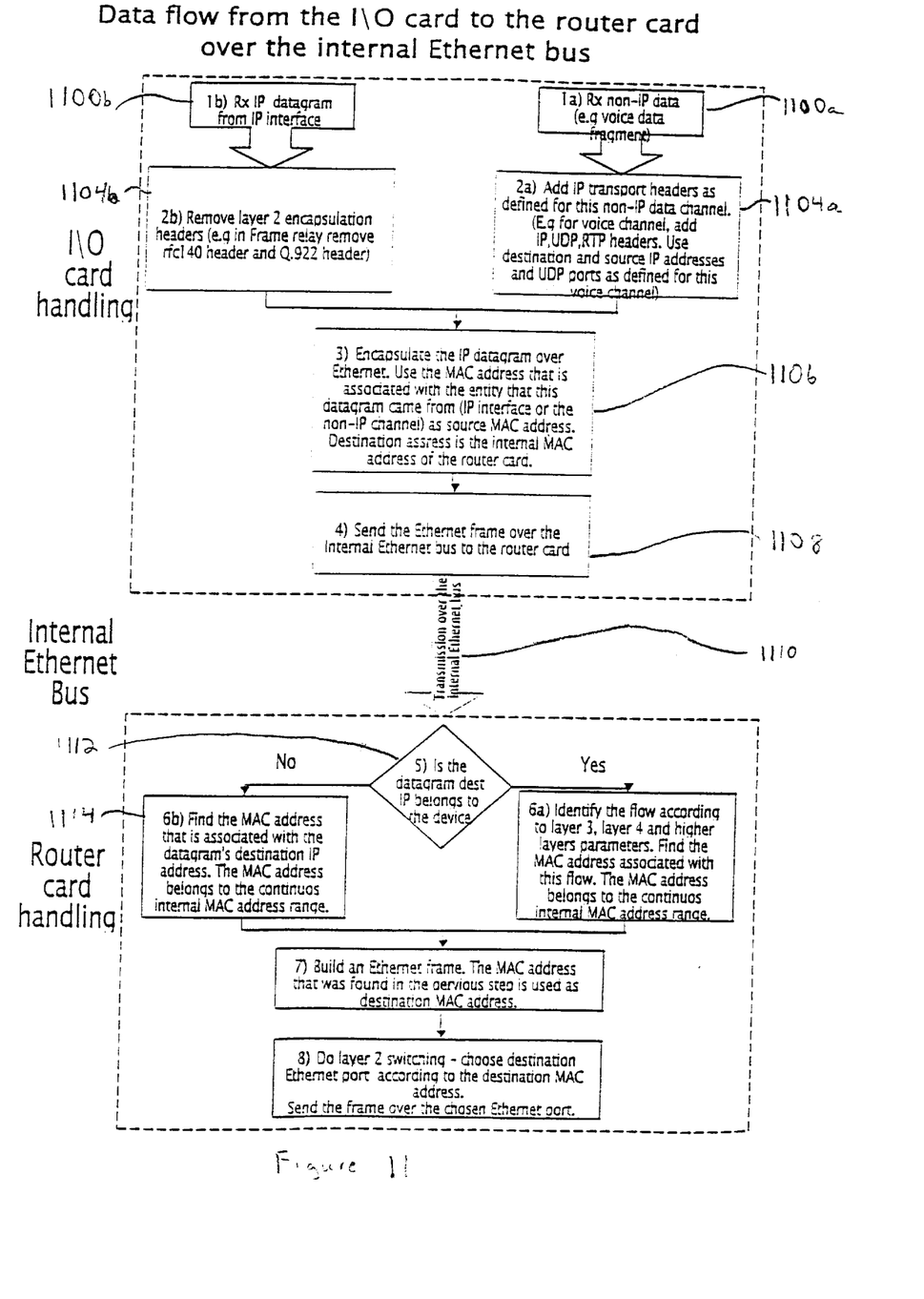
FIG. 11 illustrates the data flow from the I/O card to router card, for both locally and remotely designated IP flows.

FIGS. 10 and 11 illustrate the data flow between the router card to I/O card and I/O card to router card, respectively, for both locally and remotely designated IP flows; to be described hereafter:

1. Locally Designated EP Flows

Any IP datagram whose destination IP address is the device address is a locally designated datagram. The device is the IP endpoint of such flows. A different entity on one of the I/O cards may serve each such flow (for example a certain software instance that handles a specific voice channel on one of the I/O cards).

On the downstream direction (from router card to the I/O card), when the device receives a local flow datagram, the router card is responsible to identify the local flow according to the layer 3, 4 and even higher layer parameters 1002, 1004, 1006b. After identifying the flow, the router card maps it to a MAC address that is associated with this flow 1006b. The IP flow is then encapsulated in an Ethernet frame where this MAC address is used as destination MAC address 1008. The data on layer 3 and above is unaltered by the router card. The datagram is then forwarded by the router card to the correct Ethernet bus (and therefore to the correct I/O card) as part of regular layer 2 switching process 1010, 1012.

When the I/O card receives the datagram from the internal Ethernet bus, it uses the flow id from the MAC address as an index to a lookup table to find the destination server software (a certain software entity) that processes this flow 1014, 1016. This software entity does not look at the transport headers (e.g. IP and UDP or IP and TCP etc.). It can remove the IP transport headers to handle the data at the application level 1018.

On the upstream side (from I/O to router card), before one of the entities of the I/O card (voice channel for example) sends data to the router card, it first encapsulates the application data with IP transport headers 1104a. Then it encapsulates this IP datagram over Ethernet 1106. The destination MAC address of this frame is the internal MAC address of the router. The source MAC of this Ethernet frame is the MAC address that was assigned to this entity 1106. The frame is now sent over the internal Ethernet bus to the router card 1108. The router card forwards this datagram according to its destination IP address. If the destination address is the device IP then it's again treated as local designated flow, otherwise, it's handled as external flow.

2. Remote Externally Designated EP Flow

Any IP datagram whose destination IP address is not the same as the device address is considered a remote IP flow. An internal MAC address from the continuous MAC range is assigned to each IP interface on every I/O card. On the downstream, when the router card receives an external flow 1002, 1004, 1006a, 1008 it uses its IP routing table to map the destination IP address to a next hop MAC address 1006a. The datagram is then forward by the router card to the correct Ethernet bus (and therefore to the correct I/O card) as part of regular layer 2 switching process 1010. When the I/O card receives the datagram from the internal Ethernet bus, it uses the flow id from the destination MAC address as an index to a lookup table 1014, 1016 to match the IP interface that this datagram should be forwarded through 1018. Now the I/O card removes the Ethernet header and encapsulates the IP datagram over the network layer that this IP interface uses (e.g. frame relay, PPP, etc.).

On the upstream, after one of the IP interfaces receives data 1100b, it first removes the layer 2 headers 1104b (e.g. if it's IP over Frame Relay, it removes the RFC1490 and the Frame Relay headers); then it encapsulates the IP datagram over Ethernet with the internal MAC address of the router card as the destination MAC address. The source MAC of this Ethernet frame is the MAC address that belongs to the IP interface 1106. Then it sends the data over the internal Ethernet bus to the router card 1108. The router card forwards this datagram according to its destination IP address. If the destination address is the device IP, then it's again treated as local designated flow, otherwise, it's handled as external flow.

CONCLUSION

A system and method has been shown in the above embodiments for the effective implementation of a high capacity computer-based telecommunications device. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, specific computing hardware, specific peripherals, telecom busses, specific pin counts, bus speeds, number of connectors and network busses. In addition, the specific protocols are representative of the preferred embodiment and should not limit the scope of the invention.

What is claimed is:

1. A communications device having a backplane utilizing a bus having a set number of slots, a system for extending the number of slots available on the backplane, said system comprising:
    a first CompactPCI bus having a first host slot, a first bridge slot and a first set of input/output slots;
    a second CompactPCI bus having a second host slot, a second bridge slot and a second set of input/output slots;
    a first host card inserted into said first host slot, said first host card including a first PCI-PCI bridge connected to said first CompactPCI bus, a first serializer/deserializer, and a first PCI bus connecting said first PCI-PCI bridle and said first serializer/deserializer;
    a first bridge card inserted into said first bridge slot, said first bridge card including a second PCI-PCI bridge connected to said first CompactPCI bus, a second serializer/deserializer, and a second PCI bus connecting said second PCI-PCI bridge and said second serializer/deserializer;
    a second host card inserted into said second host slot, said second host card including a third PCI-PCI bridge connected to said second CompactPCI bus, a third serializer/deserializer, and a third PCI bus connecting said third PCI-PCI bridge and said third serializer/deserializer;
    a second bridge card inserted into second bridge slot, said second bridge card including a fourth PCI-PCI bridge connected to said second CompactPCI bus, a fourth serializer/deserializer, and a fourth PCI bus connecting said fourth PCI-PCI bridge and said fourth serializer/deserializer;
    a first serial bus connecting said first host card to said second bridge card; and
    a second serial bus connecting said second host card to said first bridge card.

2. A communications device having a backplane utilizing a bus having a set number of slots, a system for extending the number of slots available on the backplane, as per claim 1, wherein said host cards, said bridge cards and input/output cards each connect to said backplane via at least a first, second and third connectors, said CompactPCI busses connected to said cards through pins of said first and second connectors, and said serializer/deserializers are connected to the respective serial buses through pins of said third connector,
    wherein said one or more input/output cards are inserted into said first and second set of input/output slots respectively.

3. A communications device having a backplane utilizing a bus having a set number of slots, a system for extending the number of slots available on the backplane, as per claim 2, wherein said backplane further comprises one or more telecommunication busses.

4. A communications device having a backplane utilizing a bus having a set number of slots, a system for extending the number of slots available on the backplane, as per claim 3, wherein said telecommunication busses comprise at least a first and a second telecommunication busses, said first telecommunications bus connects to one or more of said cards through the pins of said third connector.

5. A communications device having a backplane utilizing a bus having a set number of slots, a system for extending the number of slots available on the backplane, as per claim 4, wherein one or more of said host cards, said bridge cards and said input/output cards further connect to said backplane via a fourth connector and said second telecommunications bus connects to one or more of said host cards, said bridge cards and said input/output cards through the pins of said fourth connector.

6. A communications device having a backplane utilizing a bus having a set number of slots, a system for extending the number of slots available on the backplane, as per claims 4, wherein said one or more telecommunication busses includes at least an H.110 bus.

7. A communications device having a backplane utilizing a bus having a set number of slots, a system for extending the number of slots available on the backplane, as per claim 3, wherein said backplane further comprises a network bus connecting at least one of said first and second set of input/output slots.

8. A communications device having a backplane utilizing a bus having a set number of slots, a system for extending the number of slots available on the backplane, as per claim 7, wherein said network bus is a StarLan bus.

9. A communications device having a backplane utilizing a bus having a set number of slots, a system for extending the number of slots available on the backplane, as per claim 1, wherein said backplane further including a shared serial communications bus connecting said first host slot, said second bridge slot and at least one of said first and second set of input/output slots.

10. A communications device having a backplane utilizing a bus having a set number of slots, a system for extending the number of slots available on the backplane, as per claim 1, wherein said first host slot is a system slot and said first host card is a first system card, said first system card having a system processor located thereon controlling a first set of one or more input/output cards on said first CompactPCI bus and controlling a second set of one or more input/output cards on said second CompactPCI buss
    wherein said second host slot is another system slot and said second host card is a second system card, said second system card acting as a slave until a failure of said first system card upon which a redundant switchover occurs and said second system card acts as a master, and
    wherein said first serializer/deserializer is connected to said fourth serializer/deserializer via said first serial bus and said second serializer/deserializer is connected to said third serializer/deserializer via said second serial bus.

11. A communications device having a backplane utilizing a bus having a set number of slots, a system for extending the number of slots available on the backplane, as per claim 1, wherein said first and second serial bus and said first through fourth serializer/deserializers are implemented utilizing low voltage differential signaling.

12. A backplane for a high capacity communications device, said backplane comprising:
a first CompactPCI bus located on said backplane having a system slot and a first set of input/output slots;
a second CompactPCI bus located on said backplane having a bridge slot and a second set of input/output slots, and
a serial bus connecting point to point said system slot to said bridge slot;
a network bus;
a first H.110 telecommunications bus;
a second H.110 telecommunications bus;
a serial communication bus connecting said system slot, said bridge slot and at least one of said first and second set of input/output slots, and
a power supply bus.

13. A backplane for a high capacity communications device, as per claim 12, wherein said network bus is a StarLan bus and connects at least one of said first and second set of input/output slots.

14. A backplane for a high capacity communications device, as per claim 12, wherein said serial communications bus is utilized for control information and as a redundant path for signaling information between modules inserted into said backplane.

15. A high-capacity telecommunications device, said device comprising:
a backplane;
a first CompactPCI bus located on said backplane having a system slot and a first set of input/output slots;
a second CompactPCI bus located on said backplane having a bridge slot and a second set of input/output slots, and
a serial bus connecting said system slot to said bridge slot;
a system card inserted into said system slot, said system card comprising a first PCI-PCI bridge connected to said first CompactPCI bus, a first PCI serializer/deserializer, and a first PCI bus connecting said first PCI-PCI bridge and said first serializer/deserializer, said first serializer/deserializer connected to said serial bus;
a bridge card inserted into said bridge slot, said bridge card comprising a first PCI-PCI bridge connected to said second CompactPCI bus, a second PCI serializer/deserializer, and a second PCI bus connecting said second PCI-PCI bridge and said second serializer/deserializer, said second serializer/deserializer connected to said serial bus, said system card, bridge card, and serial bus acting to bridge said first CompactPCI bus and said second CompactPCI bus;
a first set of one or more input/output cards connected to said first set of input/output slots;
a second set of one or more input/output cards connected to said second set of input output slots;
a telecommunications bus located on said backplane, said telecommunications bus connected to one or more of said cards;
a network bus located on said backplane, said network bus connected to one or more of said cards;
a router connected at least to said network bus;
one or more destination entities, said entities residing on one or more of said input/output cards;

said router receives a datagram, determines a destination entity of said datagram, encapsulates said datagram into a frame, the address of said frame designating said destination entity;
said encapsulated datagram is forwarded to an input/output card having said destination entity residing therein over said network bus;
said input/output card receiving said datagram, determines said destination entity via said address of said frame, and
said input/output card forwards said datagram to said destination entity.

16. A high-capacity telecommunications device, as per claim 15, wherein said backplane further comprises a power supply bus.

17. A high-capacity telecommunications device, as per claim 15, wherein said bridge cards and said input/output cards connect to said backplane via at least a first, second and third connectors, said CompactPCI busses connect to said cards through pins of said first and second connectors, and said serializer/deserializers connect to said serial bus through pins of said third connector.

18. A high-capacity telecommunications device, as per claim 17, wherein said telecommunications bus connects to one or more of said cards through pins of said third connector.

19. A high-capacity telecommunications device, as per claim 18, wherein said backplane further comprises a second telecommunications bus.

20. A high-capacity telecommunications device, as per claim 19, wherein said cards further connect to said backplane via a fourth connector and said second telecommunications bus connects to one or more of said cards through pins of said fourth connector.

21. A high-capacity telecommunications device, as per claim 15, wherein said telecommunications bus is a H.110 bus.

22. A high-capacity telecommunications device, as per claim 15, wherein said network bus is a StarLan bus.

23. A high-capacity telecommunications device, as per claim 15, wherein said datagram has at least TCP/UDP and IP headers and said router determines said destination entity of said received datagram utilizing said headers.

24. A high-capacity telecommunications device, as per claim 15, wherein said router encapsulates said datagram into a MAC frame, the least significant bits of the address of said MAC frame designating said destination entity.

25. A high-capacity telecommunications device, as per claim 15, wherein said card receiving said encapsulated datagram determines said destination entity of said received encapsulated datagram by utilizing the least significant bits of the address of said MAC frame as an index to a look up table.

26. A high-capacity telecommunications device, as per claim 15, wherein said destination entity is a software entity to handle the data located in said datagram.

27. A high-capacity telecommunications device, as per claim 15, wherein said destination entity is an interface for forwarding said datagram to a destination external from said device.

28. A high-capacity telecommunications device, as per claim 27, wherein said input/output card receiving said datagram encapsulates said datagram into the appropriate network headers before forwarding to said interface.

* * * * *